C. E. MARK.
SUSPENDED TENT.
APPLICATION FILED MAR. 7, 1903.
961,704.
Patented June 14, 1910.
8 SHEETS—SHEET 1.
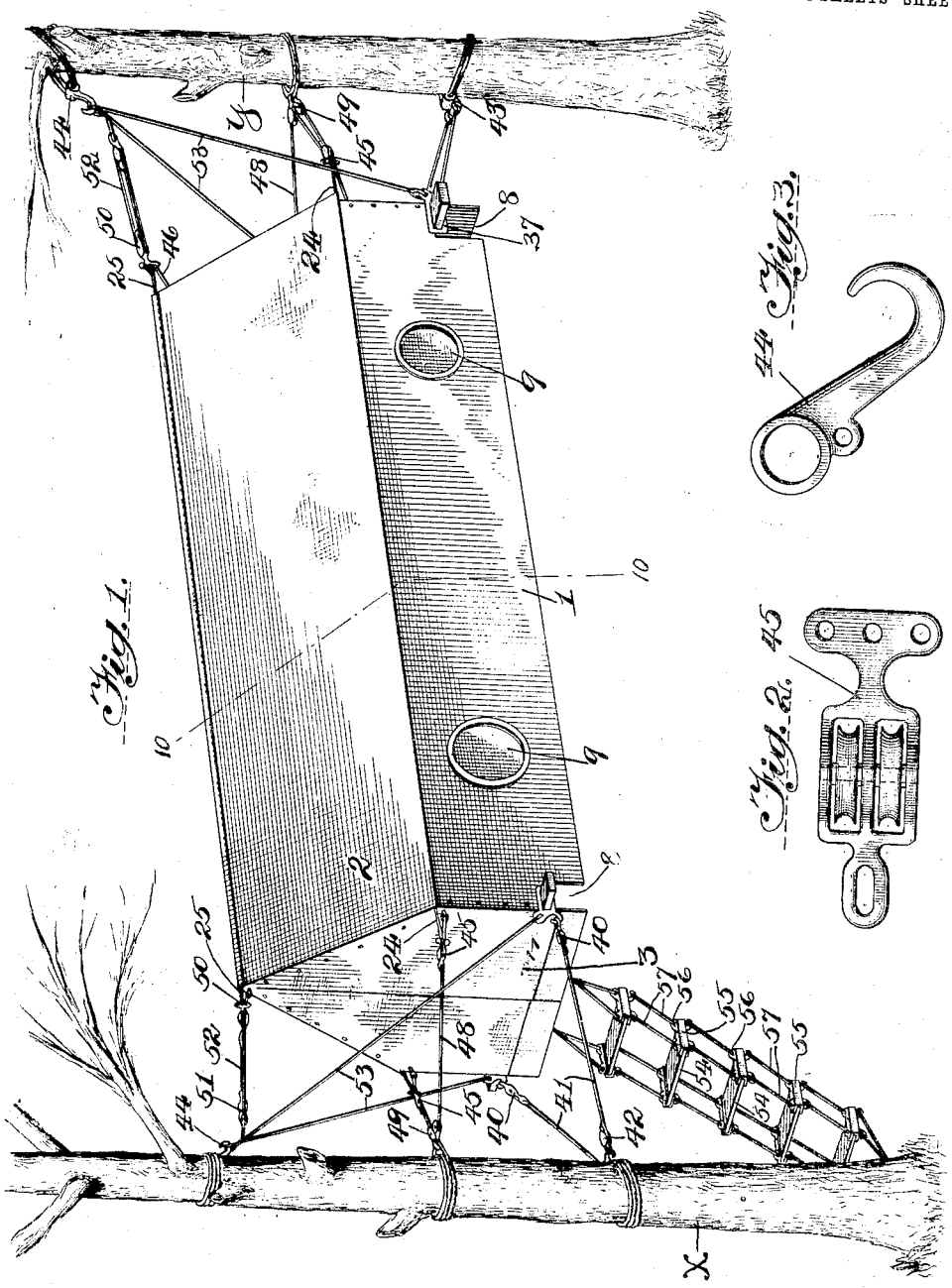
Witnesses.
Iva D. Perry
J. B. Weir
Inventor.
Charles E. Mark
By Bulkley & Durand
Attys

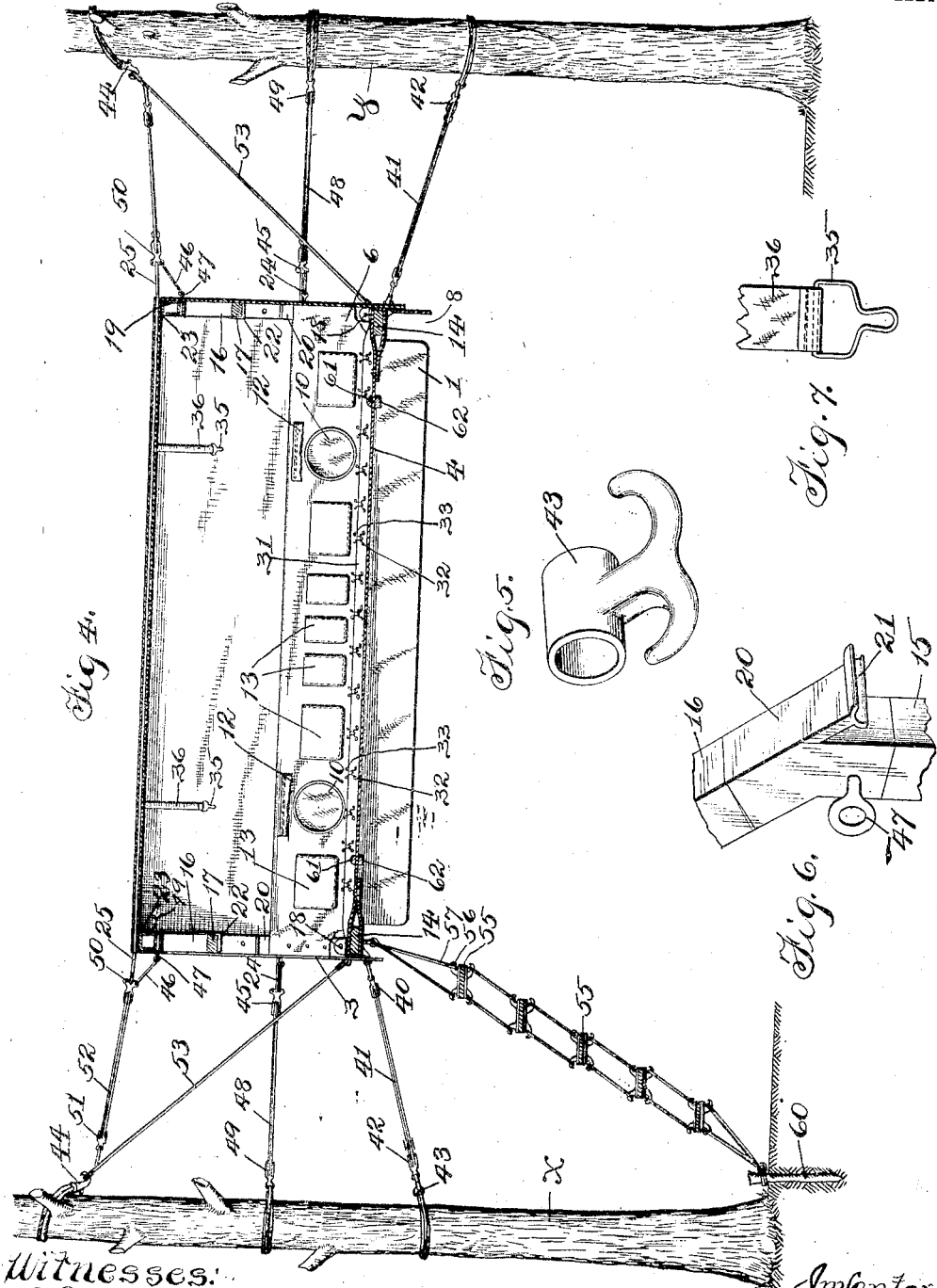

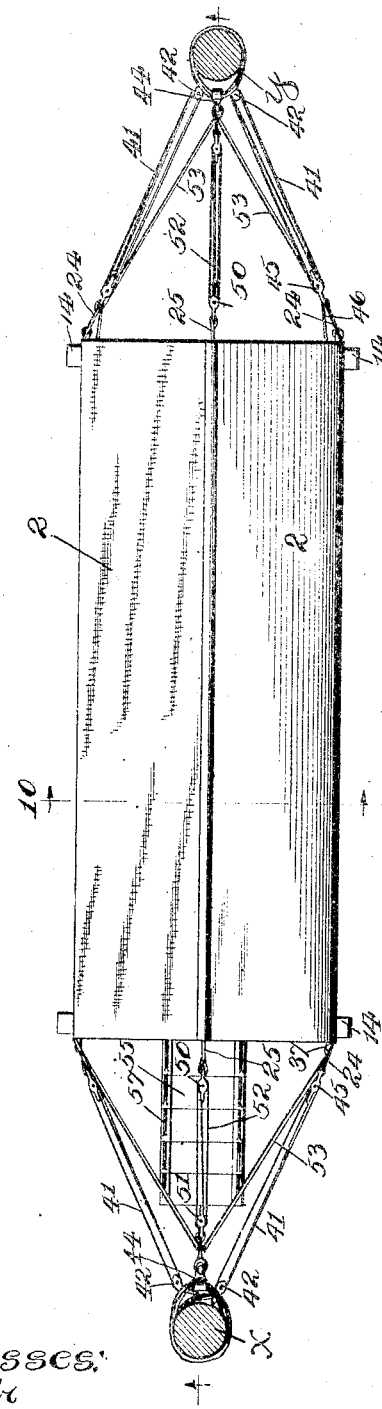

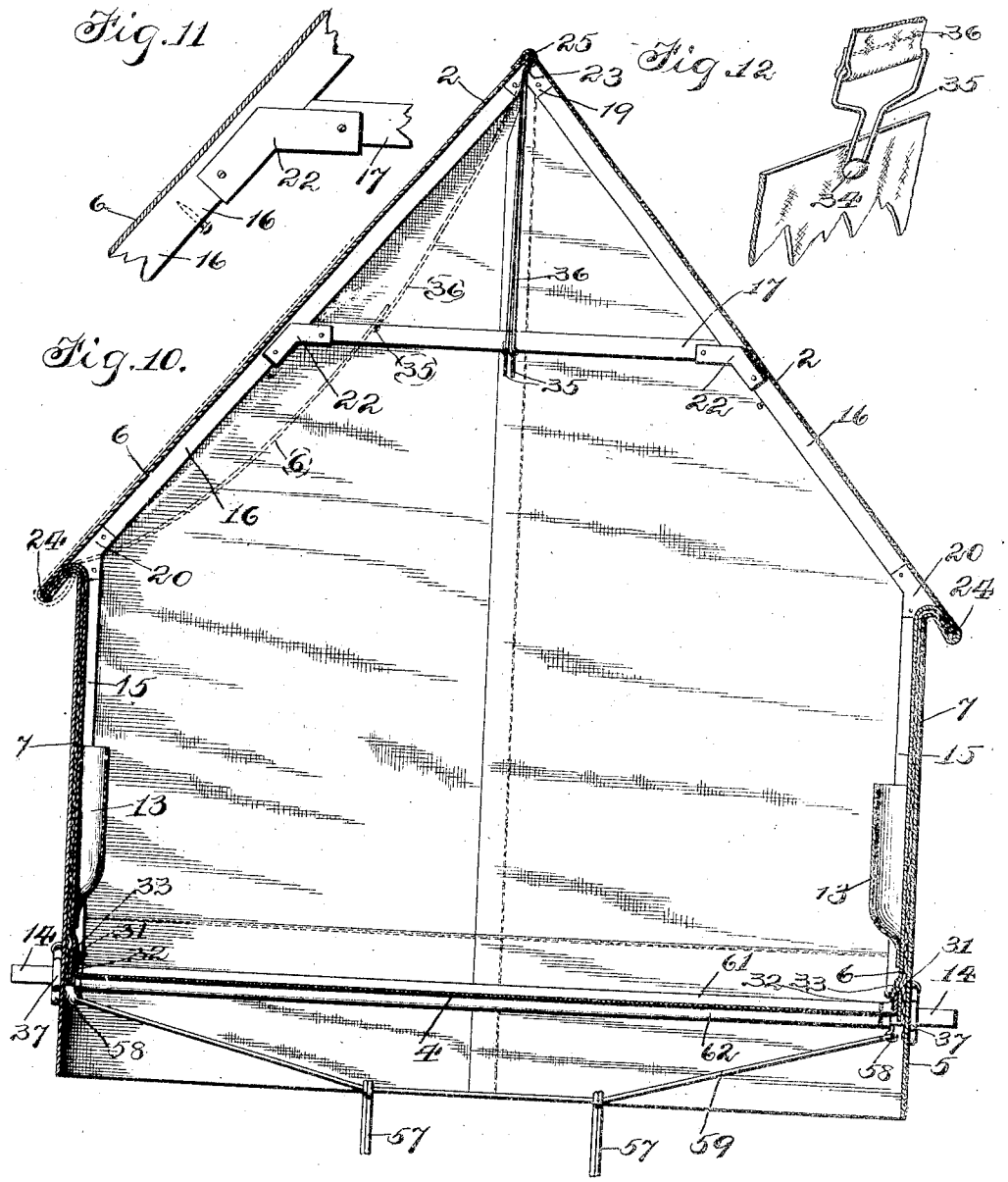

C. E. MARK.
SUSPENDED TENT.
APPLICATION FILED MAR. 7, 1903.
961,704.
Patented June 14, 1910.
8 SHEETS—SHEET 5.
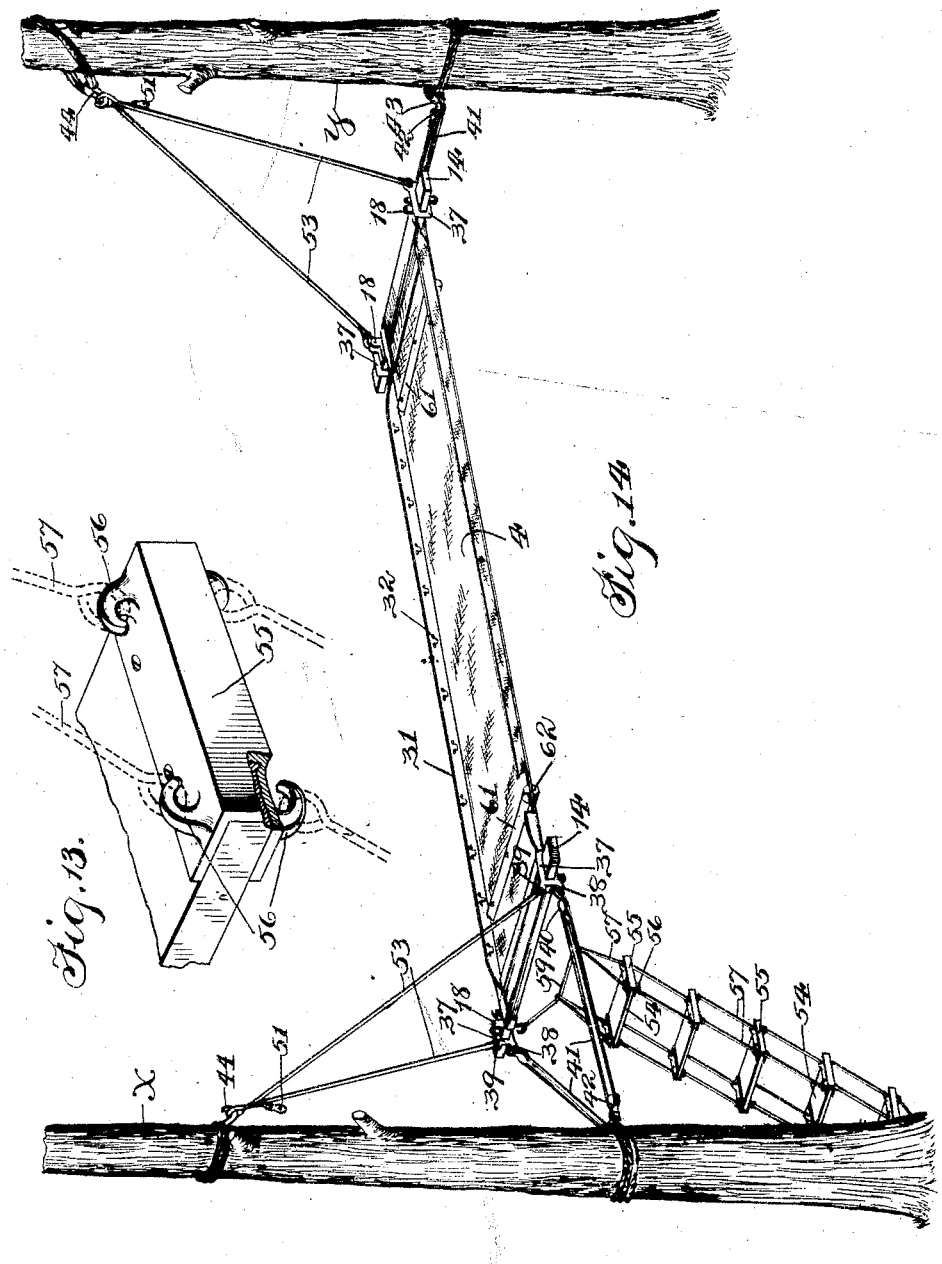

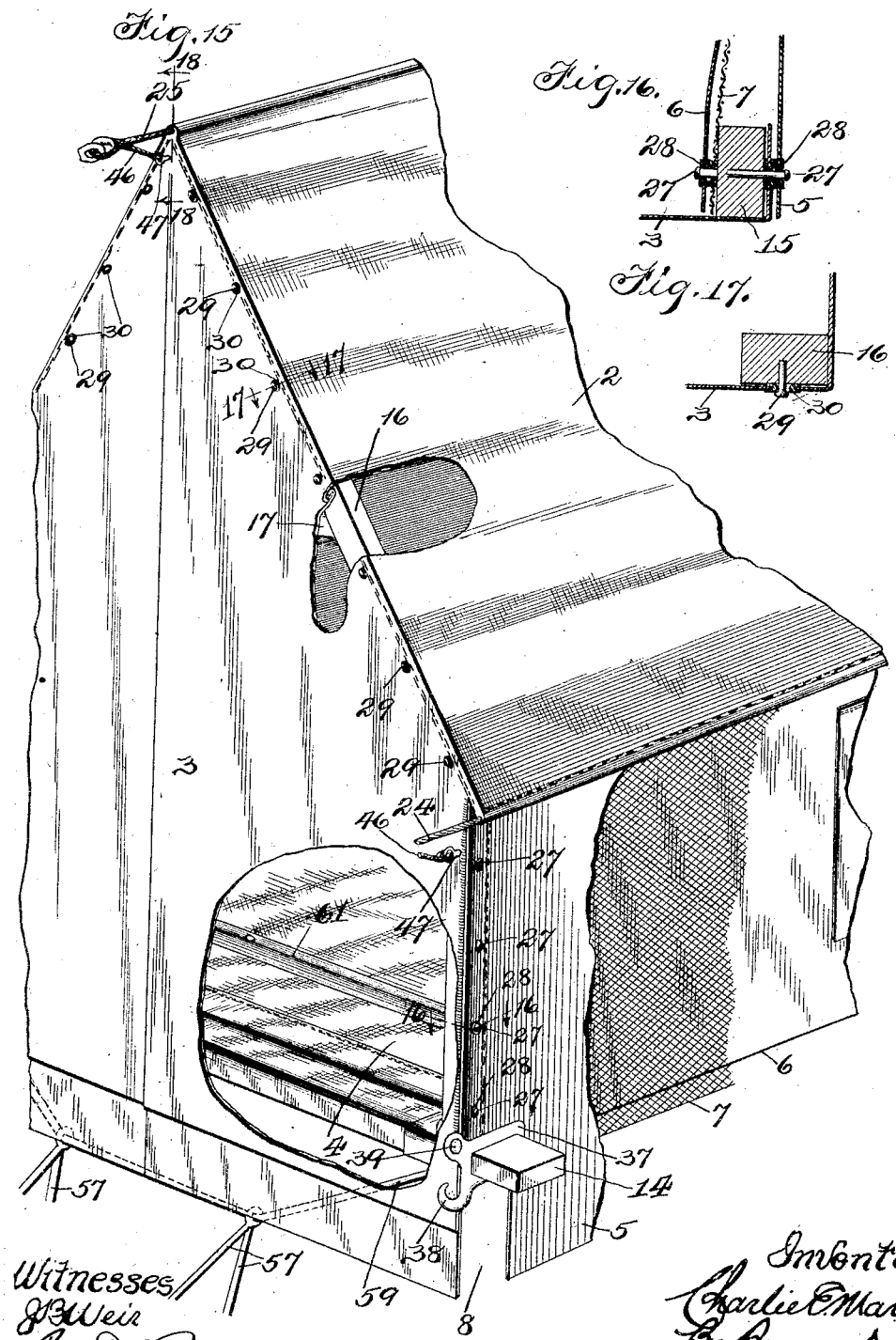

C. E. MARK.
SUSPENDED TENT.
APPLICATION FILED MAR. 7, 1903.

961,704.

Patented June 14, 1910.
8 SHEETS—SHEET 7.

Witnesses:
J B Weir
Ira D Perry

Inventor:
Charlie E Mark
By Buckley & Durand
attys

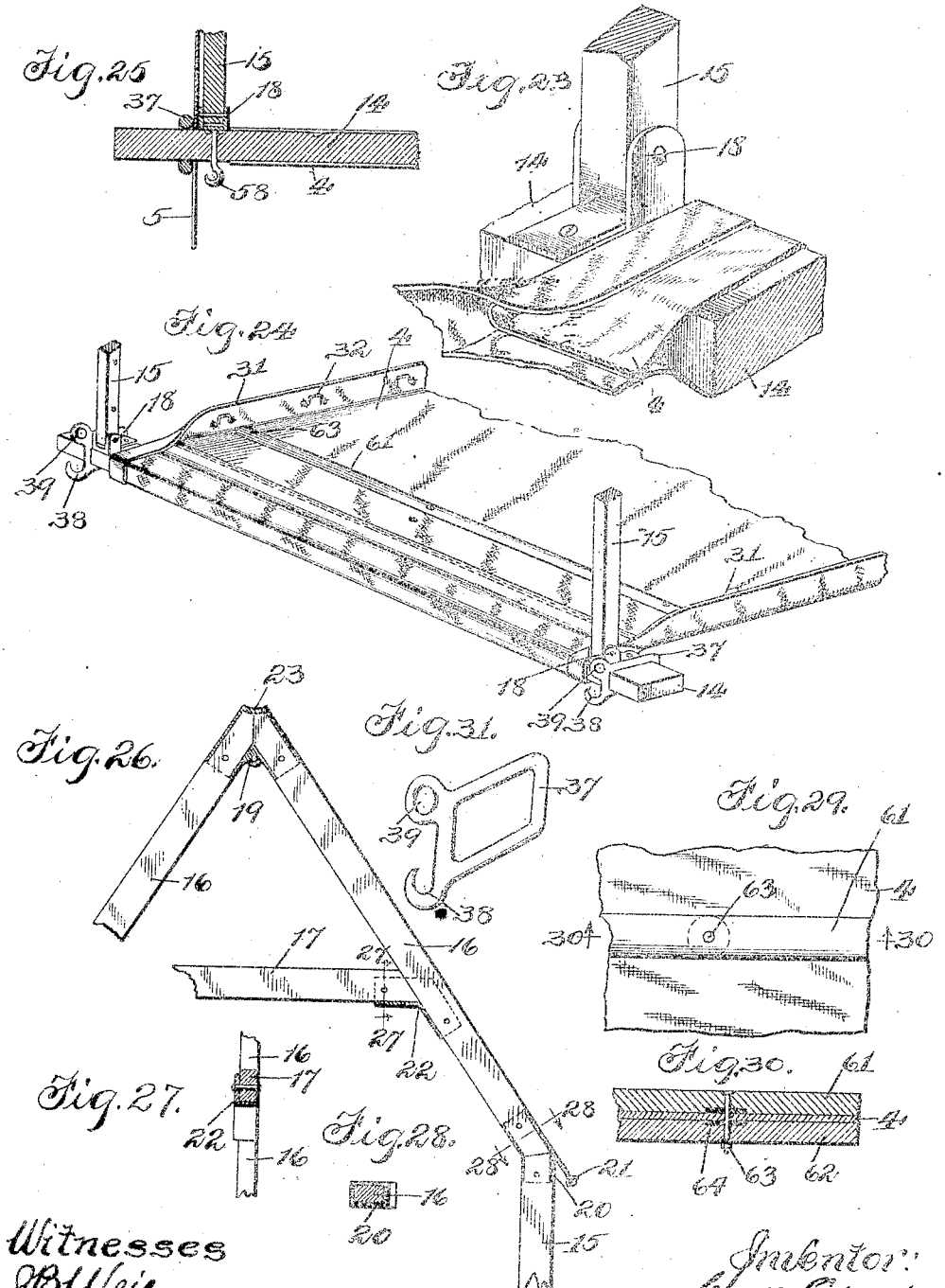

UNITED STATES PATENT OFFICE.

CHARLIE E. MARK, OF CHICAGO, ILLINOIS.

SUSPENDED TENT.

961,704.  Specification of Letters Patent.  Patented June 14, 1910.

Application filed March 7, 1903. Serial No. 146,635.

*To all whom it may concern:*

Be it known that I, CHARLIE E. MARK, a citizen of the United States of America, and resident of Chicago, Cook county, Illinois, have invented a certain new and useful Improvement in Suspended Tents, of which the following is a specification.

My invention contemplates a tent which can be suspended above the ground, either on trees, poles, or other suitable supports, and which can be readily and easily put together and taken apart.

More specifically, my invention contemplates a tent of the foregoing character having certain features and details whereby its different walls may be drawn taut and maintained in their proper condition, and whereby the floor in particular may be maintained in a taut and firm condition.

It also contemplates certain details and features of construction whereby the tent may be held firmly against vibration or side swing, and whereby the different flaps, windows, and openings of the tent may be adjusted or opened and closed to suit the comfort and convenience of the occupant.

The nature and advantages of my invention will, however, hereinafter more fully appear.

Figure 18:
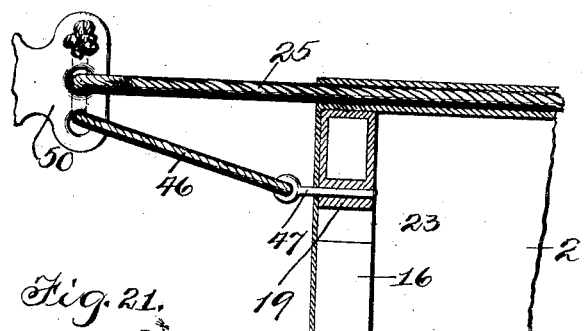
Figure 21:
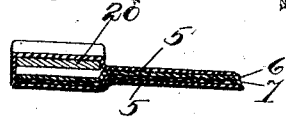
Figure 20:
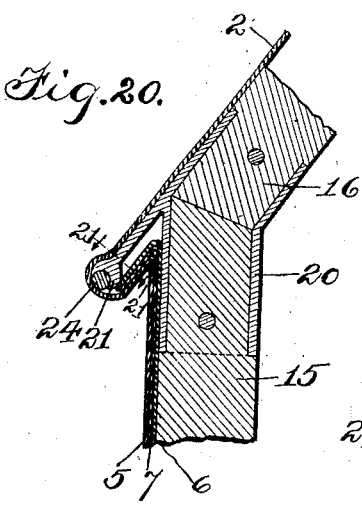
Figure 19:
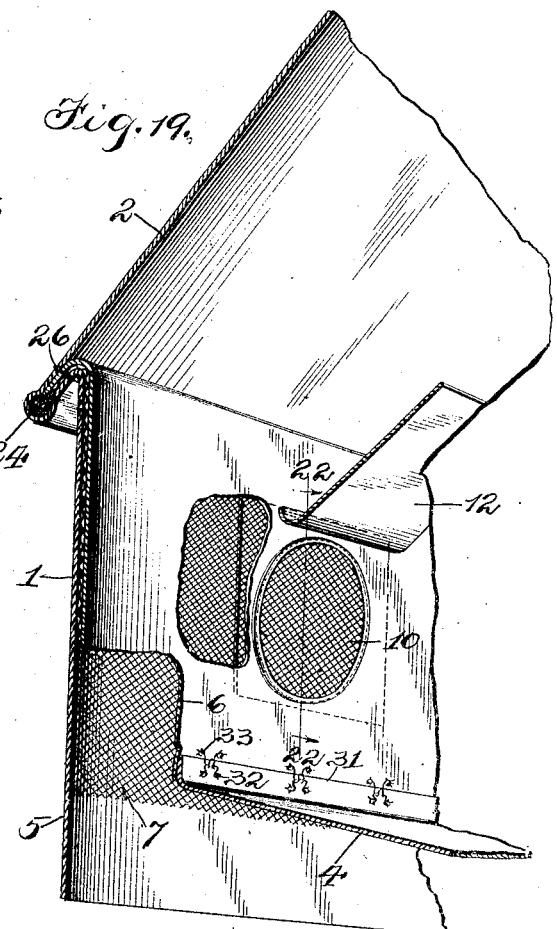
Figure 22:
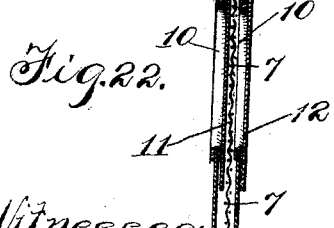

In the accompanying drawings, Figure 1 is a perspective illustrating a tent constructed in accordance with my invention and showing the same supported in an elevated position by a couple of trees. Fig. 2 is a plan of one of the pulleys employed for tightening up the ropes or cords which support or stay the tent. Fig. 3 is a side elevation of one of the hooks employed for suspending the tent from a tree, pole, or other like object. Fig. 4 is a longitudinal section through the tent shown in Fig. 1. Fig. 5 is a perspective of one of the double hooks employed in connecting the tent with the trees or other supports. Fig. 6 is a perspective of the corner or eaves portion of one of the end frames of the tent. Fig. 7 is an enlarged side elevation of one of the devices for holding the inner flaps of the tent in an elevated position. Fig. 8 is a plan of the tent shown in Fig. 1. Fig. 9 is a horizontal section of the same. Fig. 10 is an enlarged transverse section of a tent on line 10—10— of Fig. 1. Fig. 11 is a detail illustrating the construction of one of the end frames of the tent. Fig. 12 is a perspective of the lower end of one of the straps or devices for holding the inner flaps of the tent in an elevated position, and showing the adjacent portion of the flap. Fig. 13 is a perspective of the end portion of one of the steps of the ladder leading from the ground to the door of the tent. Fig. 14 is a perspective of the floor of the tent showing the same suspended in place between two trees. Fig. 15 is an enlarged perspective of one of the forward corners of the tent, certain portions of the roof, and side and end walls being broken away for the purpose of showing the interior parts. Fig. 16 is a horizontal section on line 16—16 in Fig. 15. Fig. 17 is a section through the upper portion of one of the end frames on line 17—17 in Fig. 15. Fig. 18 is a horizontal section through the corner or eaves portion of one of the end frames and adjacent portions. Fig. 19 is an interior perspective of one of the forward corner portions of the tent, the floor, side and top walls being shown in section. Fig. 20 is a vertical section through the corner or eaves portion of one of the end frames of the tent. Fig. 21 is a detail sectional-view on line 21—21 in Fig. 20. Fig. 22 is a vertical section through one of the tent windows on line 22—22 in Fig. 19. Fig. 23 is a perspective of the lower corner of one of the end frames. Fig. 24 is an enlarged perspective of one end of the floor of the tent and the lower portion of the end frame. Fig. 25 is a vertical section through the lower corner of one of the end frames. Fig. 26 is a fragmentary inside view of one of the end frames, showing the castings which form the joints between the different parts in section. Fig. 27 is a vertical section on line 27—27 in Fig. 26. Fig. 28 is a cross-section through the upper corner or eaves portion of the end frame shown in Fig. 26, on line 28—28. Fig. 29 is an enlarged plan of a portion of the tent floor and a portion of one of the upper floor cleats. Fig. 30 is a vertical-longitudinal section through the floor and the upper and lower floor cleats, on line 30—30 in Fig. 29. Fig. 31 is a perspective of one of the clips or castings which are applied to the end portions of the lower bar or sill of each end frame of the tent, and which serve to connect the sills with the suspending and other ropes for connecting the tent with the trees or other supports.

As thus illustrated, my invention consists of a tent which can be easily put together and taken apart, and which can be suspended at any suitable or desired distance above the ground, so as to provide a thoroughly dry and safe place for sleeping. As shown in the drawings, said tent comprises preferably a pair of side walls 1, the sloping roof walls 2, the end walls 3, and the floor 4. The said side walls preferably comprise inner and outer flaps, 5 and 6, of canvas or other suitable material, and an interposed layer of mosquito netting 7. The said outer flap is preferably of a size to extend somewhat below the floor of the tent, and can be cut away at its lower corners, as at 8. Each side wall may be provided with one or more windows 9, consisting of a pair of rings 10—10, mounted respectively in the inner and outer flaps, and separated by the layer of mosquito netting 7 and a small window flap 11. A similar window flap 12 can be arranged to normally cover the inner surface of each window. If desired, the inner flap of each side wall can be provided with pockets 13 adapted to receive various articles. The structure as a whole preferably comprises two end frames, each consisting of a lower bar or sill 14, a couple of uprights 15, a couple of inclined roof members 16 united at their upper ends, and an upper horizontal beam or rafter 17. The uprights 15 are preferably connected with the sill 14 by means of pivotal connections 18. The upper ends of the inclined roof members can be connected or united by castings 19. Castings 20, having grooved seats 21, can be employed for connecting the lower ends of the members 16 with the upper ends of the uprights 15. The bracket castings 22 may serve as the means of connecting the horizontal bars or rafters 17 with the inclined roof members. Each casting 19 is preferably provided at its top with a grooved seat 23. The grooved seats 21 on the upper corner or eaves castings are adapted to receive the eaves ropes 24, while the grooved seats 23 at the tops of the end frames are adapted to receive the roof or peak cord 25. The roof walls 2 preferably extend around the eaves ropes 24, and can be united in any suitable manner with the upper edges of the side walls 1, as illustrated in Figs. 19 and 20. The upper edges of the flaps 5 can be inserted in the fold thus formed in the piece of canvas or other material constituting the roof and side wall, and can then be stitched or sewed in place, as indicated at 26, in Fig. 19. At the corners, the end walls 3 are preferably double-stitched to the roof and side walls, as shown in Fig. 15. It will be readily understood, however, that the sheets of canvas, duck, or other suitable material constituting the end, side and top walls, can be connected or united at their edges in any suitable or desired manner.

As a simple and effective arrangement for securing the end edges of the inner and outer flaps of the side walls in place, and for also securing the side edges of the end walls in place, the adjacent marginal portions of said walls and flaps can be secured to an upright 15 of the end frame in the manner shown in Fig. 16. In this figure, the edge portions of the different canvas walls are secured in place by pins or nails 27 inserted through small metal rings 28 secured to the canvas or other material. The end and roof walls of the tent can be secured to the inclined roof member 16 in the manner shown in Fig. 17. In this case, the pins or nails 29 are inserted through the small metal rings 30 secured in the double lap-seam uniting the end wall with the roof wall.

The floor 4 of the tent may consist of the strip of canvas or other suitable material of the proper size and dimensions, and can have its parallel side edges 31 turned up and provided with eyes 32 adapted to engage the hooks 33 on the inner flaps of the side walls. The said floor can have its end portions wrapped around the sills or lower bars 14 of the end frames, as, for example, in the manner shown in Figs. 23 and 24. Thus the ends of the said floor are securely fastened to the sills of the end frames, while the upturned marginal portions of the floor are adapted to be secured to the lower edges of the inner flaps of the side walls. In this way, the floor and the different walls of the tent combine to provide a chamber free from undesirable openings or apertures. It will be observed that the forward wall of the tent is preferably composed of two flaps which may be parted or separated in order to permit entrance to the tent.

As a matter of further and special improvement, the inner side flaps of the tent can be provided with buttons 34 adapted to engage the eyes or hooks 35 on the lower ends of the straps 36. These straps can be arranged to hang from the peak or upper portion of the tent, and when thus provided are adapted to support the inner flaps of the tent in elevated positions, as shown in dotted lines in Fig. 10. It will also be observed that the outer side flaps of the tent can be released from the uprights of the end frames and swung up and around the eaves of the tent, so as to rest upon the roof walls 2. By thus raising both the inner and outer side flaps of the tent, the latter is left with side walls consisting merely of the mosquito netting 7.

The tent thus constructed can be suspended in a suitably elevated position in any desired manner. For example, the tent may be suspended by suitable cords or ropes between a couple of trees X, Y, as shown in Figs. 1 and 4. These cords or ropes can be attached in any suitable manner, but as a matter of further improvement suitable pulleys are provided whereby the different suspending and staying ropes can be drawn taut for the purpose of preventing the tent from vibrating or swinging.

As shown in the drawings, the sills or lower beams of the end frames are provided at opposite ends with removable rings or castings 37, each preferably having a hook 38 and an eye 39. These hook portions 38 can be adapted to engage the rings or eyes of single pulleys 40 connected by ropes or cords 41 with the single pulleys 42. These single pulleys 42 can be connected with the double hook 43 which latter is tied to the tree. With this arrangement, the cords or ropes 41 can be drawn taut for the purpose of stretching the floor and side walls of the tent, and for the purpose of staying the tent against side swing. The eyes 39 of the castings 37 can be connected by suspending cords or ropes with the hooks 44, which are also tied to the trees. The eaves ropes 24 are preferably connected to a double pulley 45, such as shown in Figs. 2 and 18. These double pulleys are also connected with the uprights of the end frames by means of the short cords 46 and eye-bolts 47. The tightening cords 48 serve as medium of adjustable connection between these pulleys 45 and the pulleys 49, which latter are tied to the trees. In this way, the cords 48 coöperate with the cords or ropes 41 in stretching and staying the floor, side and top walls of the tent between the two trees. And this stretching of the tent is further accomplished by means of the double pulleys 50 and 51 and the cords or ropes 52, which constitute the medium of adjustable connection between the eaves rope 25 and the supporting hooks 44. The suspending cords or ropes 53, as previously explained, serve to suspend the tent in any desired position, and leave the cords 41, 48 and 52 with no other function than to properly stretch the tent and stay it against lateral swing or movement.

It will be readily understood that the different pulleys, hooks, and cords, can be of any suitable form and construction, and can be modified if desired. The ladder or stair-way leading from the ground to the forward end of the tent, and shown in Figs. 1, 4 and 14, can be of any suitable or desired construction. Preferably, however, and with a view to providing a ladder or stair-way which can be easily taken apart and put together, and which can be easily expanded or contracted to the desired length, the said ladder or stair-way may comprise a number of steps or boards 54, each provided with a pair of castings 55 adapted to fit the opposite ends of the board. Each casting may be provided with hook-like lugs 56 arranged as shown in Fig. 13, and adapted to engage the eyes formed at the ends of the connecting links 57. Thus the ladder or stair-way can be of any desired number of steps, it being a comparatively simple matter to either add or detach one or more steps. Preferably, and as shown in Figs. 10 and 25, the ends of the sills 14 are provided with depending hooks 58, adapted to receive the ends of a cord or rope 59. The upper links 57 of the stair-way or ladder can then be secured to this rope 59 in any suitable manner. The lower end of the ladder or stair-way can be connected with stakes 60. In this way, the stair-way or ladder can, as stated, be of any suitable or desired length, and can be stretched taut between the ground and the forward or entering end of the tent.

As a simple and effective arrangement for keeping the floor of the tent smooth and in proper condition, I provide the upper and lower cleats 61 and 62, arranged to extend transversely across the floor at points near the ends of the tent. These cleats, with the floor between them, can be secured together by bolts 63, which can be tightened to clamp the canvas or cloth of the floor tightly between the opposing faces of the cleats. Preferably the openings through the floor for the bolts are encircled by washers 64, of leather or other suitable material. The opposing faces of the slats are preferably provided with recesses or seats adapted to receive these washers 64, and adapted to permit the slats to be brought tightly together for the purpose of firmly clamping the canvas or other material.

Thus constructed, it will be seen that my improved tent preferably comprises a pair of end frames which can be connected with trees, poles, or other supports through the medium of pulleys and cords, and between which the floor, top and side walls of the tent can be stretched taut and held in the proper condition. The pivotal connections between the sills of the end frames and the uprights 15 facilitate the stretching of the tent, and permit the proper tension to be applied to the tops of the frames without disturbing the sills. These pivotal connections also facilitate the assembling of the different parts of the tent, and make it possible to adjust the different cords in such manner as to place all of the walls of the tent under the proper tension. Furthermore, the construction is such that the top, side and end walls of the tent, together with the upper portions of the end frames, can be removed, leaving the floor alone suspended between the trees or other supports. In this way, the floor of the tent can, if desired, be employed as a hammock. Obviously, however, the chief advantage of my improvement lies in the fact that the tent may be easily and satisfactorily suspended above the ground, so as to provide a dry and safe place for sleeping. Broadly considered, therefore, my invention contemplates a tent which may be suspended in an elevated position, and which may be stretched taut between two suitable supports.

It will be seen that my invention consists essentially of a non-swaying aerial tent provided with a stretched or flat floor. By aerial it will be understood that I mean a tent suspended in the air, and of a character to be suspended above the ground as shown and described.

I claim as my invention—

1. A non-swaying aerial tent comprising a floor, side and roof walls, end frames to which the floor and walls are secured, and cords and pulleys for supporting the tent in an elevated position, and adapted for drawing the floor and walls of the tent taut between two supports, the structure as a whole being essentially adapted to be supported in mid-air by stretching it taut between two suitable supports.

2. A non-swaying aerial tent comprising a floor, side and roof walls of canvas or other like material, end frames to which said floor and walls are secured, each frame comprising a sill, uprights, and inclined roof-members, the lower ends of the uprights being pivotally connected with the sill, and attaching devices for suspending the tent in an elevated position and adapted for drawing the said floor and walls taut between the two end frames.

3. A non-swaying tent comprising a suitable floor, side and roof walls, end walls, frames to which said floor and walls are suitably secured, ropes extending through the eaves of the tent, another rope extending through the peak or apex of the tent, attaching devices for suspending the tent in an elevated position and drawing said walls taut, and means for tightening said ropes.

4. A non-swaying aerial tent comprising a pair of end frames, swinging side walls having their ends buttoned to the said end frames, end walls and roof walls also buttoned to said end frames, a floor stretched between said end frames, and cords and pulleys for connecting said end frames with supports, and whereby the floor and walls of the tent may be drawn taut between the said end frames.

5. A non-swaying aerial tent, means for stretching said tent taut between two suitable supports, said tent having inner and outer side flaps separated by mosquito netting and having a floor provided with side portions adapted to be connected with the inner flaps.

6. A non-swaying aerial tent, means for stretching said tent taut between suitable supports, said tent being constructed with inner and outer side flaps having windows, mosquito netting interposed between the flaps at each side of the tent, hangers whereby the inner flaps may be raised and held in an elevated position, and means whereby the outer flaps may be swung outward, so as to leave the tent with side walls composed solely of the mosquito netting.

7. A non-swaying aerial tent comprising end frames provided at their upper corners or eaves portions with grooved seats, a floor and side and roof walls for the said tent, parallel eaves ropes seated in said grooves or seats, and means for drawing said ropes taut, the structure as a whole being essentially adapted to be supported in mid-air by stretching it taut between two supports.

8. A non-swaying aerial tent, said tent comprising end frames provided at their tops or apices with grooves or seats, a floor and side and roof walls for said tent, and a peak rope extending along the peak of the tent and lying in said seats or grooves, together with means for drawing said rope taut, the structure as a whole being essentially adapted to be supported in mid-air by stretching it taut between two supports.

9. A non-swaying aerial tent, comprising a pair of end sills, a floor stretched between said sills, vertically disposed frame members pivotally connected with said sills, side and roof walls stretched between said frame members, and means for connecting said sill and frame with supports, the structure as a whole being essentially adapted to be supported in mid-air by stretching it taut between two supports.

10. A non-swaying aerial tent having a flat floor and side and top and end walls, and provided also, at its ends, with two sets of ropes and means for drawing said ropes taut, the structure as a whole being essentially adapted to be supported in mid-air by stretching it taut between two supports.

11. A non-swaying aerial tent comprising a floor, side and roof walls, end frames to which the floor and walls are secured, and cords and pulleys for supporting the tent in an elevated position, and adapted for drawing the floor and walls of the tent taut between supports, the structure as a whole being essentially adapted to be supported in mid-air by stretching it taut between supports.

12. A non-swaying aerial tent comprising rigid end frames or spreaders and a flexible body, a plurality of connections for said frames, and means for drawing said body taut through said connections.

13. A non-swaying aerial tent comprising rigid end frames or spreaders and a flexible body, a plurality of connections for each lower corner thereof, and means for drawing said body taut through said connections.

Signed by me at Chicago, Cook county, Illinois, this 23rd day of February, 1903.

CHARLIE E. MARK.

Witnesses:
ARTHUR F. DURAND,
CHAS. C. BULKLEY.